US012586719B2

(12) United States Patent
Seo

(10) Patent No.: US 12,586,719 B2
(45) Date of Patent: Mar. 24, 2026

(54) MULTILAYER ELECTRONIC COMPONENT AND METHOD OF MANUFACTURING THE SAME

(71) Applicant: SAMSUNG ELECTRO-MECHANICS CO., LTD., Suwon-si (KR)

(72) Inventor: Chang Ho Seo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 196 days.

(21) Appl. No.: 18/210,262

(22) Filed: Jun. 15, 2023

(65) Prior Publication Data

US 2024/0029954 A1 Jan. 25, 2024

(30) Foreign Application Priority Data

Jul. 21, 2022 (KR) ........................ 10-2022-0090491

(51) Int. Cl.
H01G 4/30 (2006.01)
H01G 4/008 (2006.01)
(52) U.S. Cl.
CPC ............. H01G 4/0085 (2013.01); H01G 4/30 (2013.01)
(58) Field of Classification Search
None
See application file for complete search history.

(56) References Cited

U.S. PATENT DOCUMENTS

| | | | | |
|---|---|---|---|---|
| 4,097,911 | A * | 6/1978 | Dorrian | H01G 4/30 |
| | | | | 361/305 |
| 5,097,391 | A * | 3/1992 | Nomura | H01G 4/1281 |
| | | | | 29/25.42 |
| 2011/0247186 | A1 | 10/2011 | Yu et al. | |
| 2016/0372255 | A1 | 12/2016 | Maki et al. | |
| 2018/0061575 | A1* | 3/2018 | Mizuno | H01G 4/30 |
| 2018/0294097 | A1* | 10/2018 | Ono | H01G 4/12 |
| 2019/0355521 | A1* | 11/2019 | Hattori | H01G 4/30 |
| 2023/0137809 | A1* | 5/2023 | Suemasa | H01G 4/008 |
| | | | | 361/301.4 |

FOREIGN PATENT DOCUMENTS

| | | |
|---|---|---|
| JP | 5-335173 A | 12/1993 |
| JP | 6-52127 U | 7/1994 |

(Continued)

OTHER PUBLICATIONS

Office Action issued on Dec. 18, 2025 in the corresponding Korean Patent Application No. 10-2022-0090491 with English translation.

*Primary Examiner* — Timothy J. Dole
*Assistant Examiner* — Esther N Lian
(74) *Attorney, Agent, or Firm* — Morgan, Lewis & Bockius LLP

(57) ABSTRACT

A multilayer electronic component and a method of manufacturing the same are disclosed. The multilayer electronic component includes: a body including dielectric layers and internal electrodes alternately stacked with respective dielectric layers interposed therebetween; and external electrodes disposed on the body and connected to the internal electrodes, wherein at least one of the internal electrodes contains a metal oxide at one of end portions thereof.

9 Claims, 9 Drawing Sheets

(56)            References Cited

FOREIGN PATENT DOCUMENTS

| | | | |
|----|----------------|---|---------|
| JP | 10-241992 | A | 9/1998 |
| JP | 2003-133169 | A | 5/2003 |
| JP | 2010-056454 | A | 3/2010 |
| JP | 2021-174823 | A | 11/2021 |
| KR | 10-2011-0113384 | A | 10/2011 |
| KR | 10-2016-0148459 | A | 12/2016 |
| KR | 10-2019-0138036 | A | 12/2019 |

* cited by examiner

II – II'

MULTILAYER ELECTRONIC COMPONENT AND METHOD OF MANUFACTURING THE SAME

CROSS-REFERENCE TO RELATED APPLICATION(S)

This application claims benefit of priority to Korean Patent Application No. 10-2022-0090491 filed on Jul. 21, 2022 in the Korean Intellectual Property Office, the disclosure of which is incorporated herein by reference in its entirety.

BACKGROUND

1. Technical Field

The present disclosure relates to a multilayer electronic component and a method of manufacturing the same.

2. Description of Related Art

A multilayer ceramic capacitor (MLCC), a multilayer electronic component, is a chip-type condenser mounted on a printed circuit board for use in various electronic products, such as image display devices, e.g. a liquid crystal display (LCD) and a plasma display panel (PDP), computers, smartphones, and mobile phones, to serve to charge or discharge electricity therein or therefrom.

The multilayer ceramic capacitor may be used as a component for various electronic devices because it has a small size, secures high capacitance, and is easy to mount. In accordance with a recent decrease in size of a component of an electronic device, there has been an increasing demand for a decrease in size and an increase in capacitance of the multilayer ceramic capacitor.

In accordance with this trend, the size of the multilayer ceramic capacitor is gradually decreasing. In order to achieve high capacitance of a multilayer ceramic capacitor with small volume, it is necessary to increase an effective volume ratio of a dielectric in the same volume of the multilayer ceramic capacitor, and therefore, the thickness of electrodes is gradually decreasing, relative thereto.

Due to the increase in performance and the decrease in size of electronic products, in which such multilayer ceramic capacitors (MLCCs) are used, MLCCs for information technology (IT) applications are further miniaturized while having a higher capacitance. In order to manufacture a high-capacitance miniaturized MLCC, it is necessary to increase the number of dielectric layers and electrode layers stacked on each other by thinning the layers. In accordance with the increasing demand for the decrease in thickness of the layers, a degree of difficulty in manufacturing an MLCC is continuously increasing as compared to that in the conventional method. A high level of technology is required for each process, such as producing thin-layered sheets or stacking and compressing the thin-layered sheets without damage. In addition, problems such as a defect and a deterioration in reliability caused by a step portion occur more conspicuously in a small chip that may not have room for design.

SUMMARY

An aspect of the present disclosure may provide a multilayer electronic component having a high capacitance in a small size by thinning dielectric layers and internal electrodes.

Another aspect of the present disclosure may provide a multilayer electronic component having no step portion by forming an internal electrode pattern through selective irradiation of laser, and a method of manufacturing the same. By doing so, it is possible to prevent a problem that a step portion causes a defect and a deterioration in reliability.

According to an aspect of the present disclosure, a multilayer electronic component may include: a body including dielectric layers and internal electrodes alternately stacked with respective dielectric layers interposed therebetween, where at least one of the internal electrodes contains a metal oxide at one of end portions of the at least one of the internal electrodes; and external electrodes disposed on the body and connected to the internal electrodes.

According to another aspect of the present disclosure, a method of manufacturing a multilayer electronic component may include: forming a body including dielectric layers and internal electrodes alternately stacked with respective dielectric layers interposed therebetween, using a deposition technique; and forming external electrodes disposed on the body and connected to the internal electrodes, wherein one of end portions of at least one of the internal electrodes is irradiated with a laser for exposure.

According to an aspect of the present disclosure, a multilayer electronic component may include: a body including dielectric layers and internal electrodes alternately stacked with respective dielectric layers interposed therebetween, where at least one of the internal electrodes contains a metal oxide at one of end portions of the at least one of the internal electrodes; and external electrodes disposed on the body and connected to the internal electrodes, where the metal oxide in the one of the end portions contacts at least one of the external electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
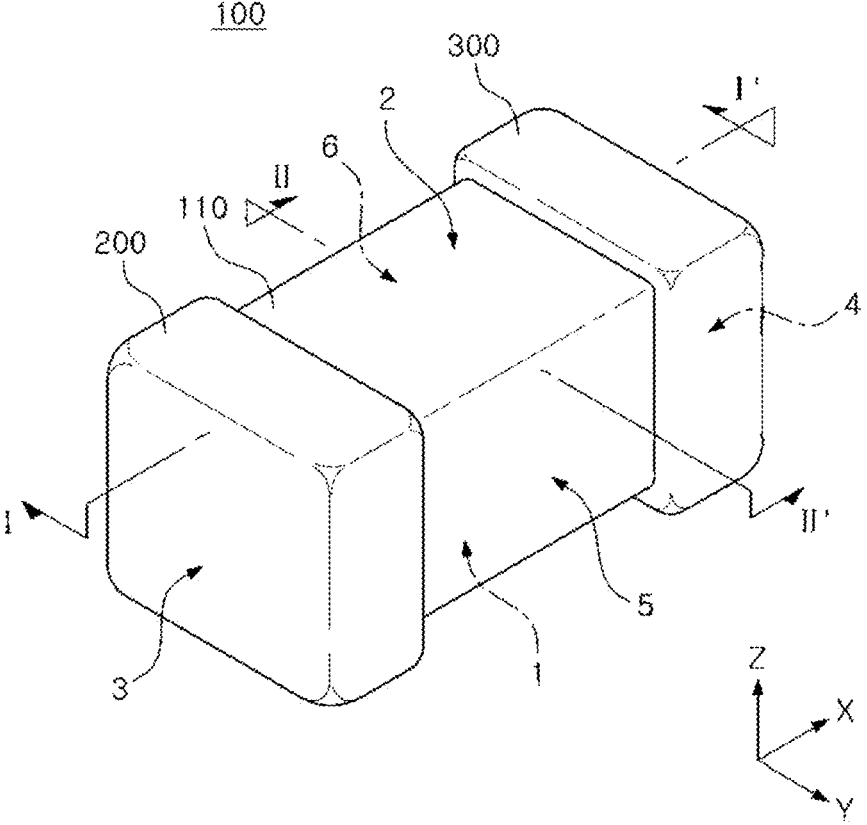
FIG. 1 schematically illustrates a perspective view of a multilayer electronic component according to an exemplary embodiment of the present disclosure.

Hereinafter, exemplary embodiments of the present disclosure will now be described in detail with reference to the accompanying drawings.

In the drawings, an X-direction may be understood as a first direction or a length direction, a Y-direction may be understood as a second direction or a width direction, and a Z-direction may be understood as a third direction, a thickness direction, or a stacking direction, but the directions are not limited thereto.

Multilayer Electronic Component

FIG. 1 schematically illustrates a perspective view of a multilayer electronic component according to an exemplary embodiment of the present disclosure.

Figure 2:
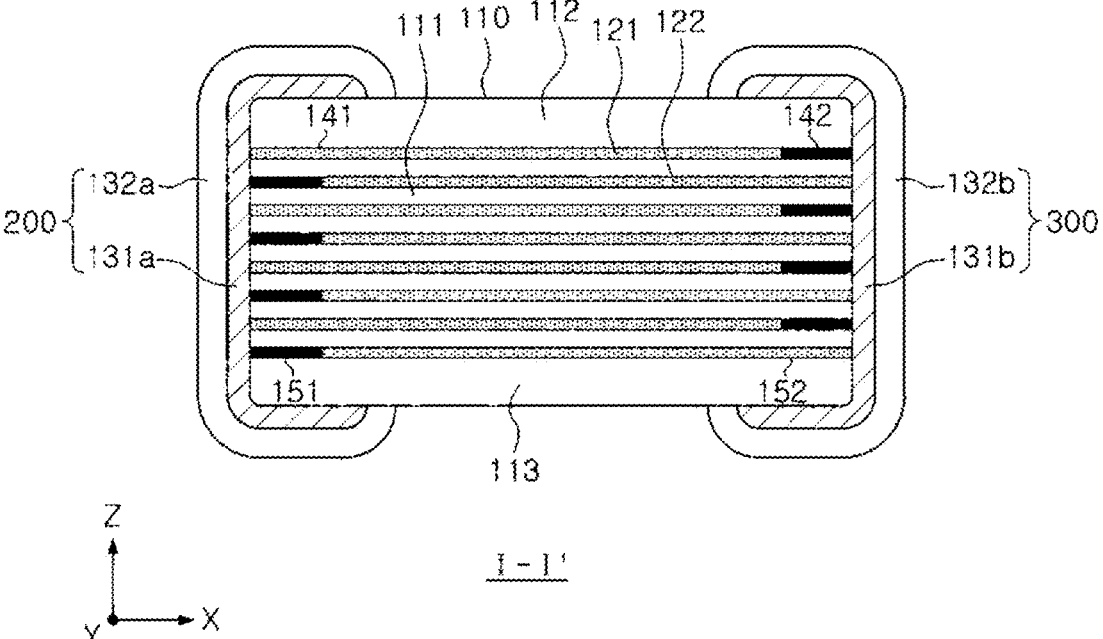
FIG. 2 schematically illustrates a cross-sectional view taken along line I-I' of FIG. 1.

FIG. 2 schematically illustrates a cross-sectional view taken along line I-I' of FIG. 1.

Figure 3:
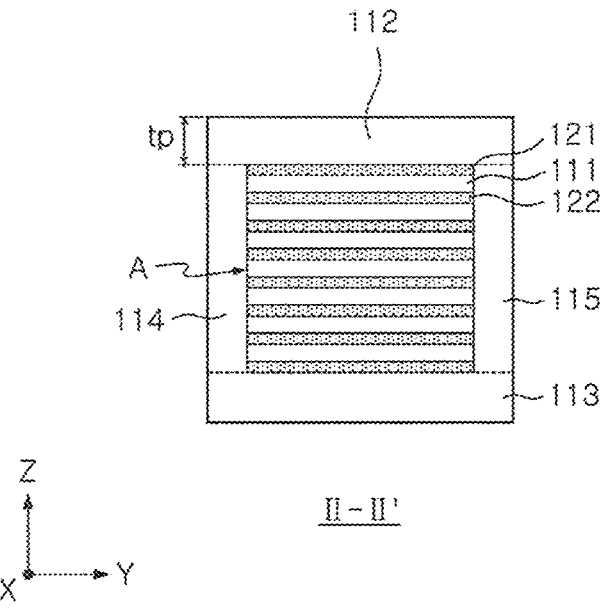
FIG. 3 schematically illustrates a cross-sectional view taken along line II-II' of FIG. 1.

FIG. 3 schematically illustrates a cross-sectional view taken along line II-II' of FIG. 1.

Figure 4:
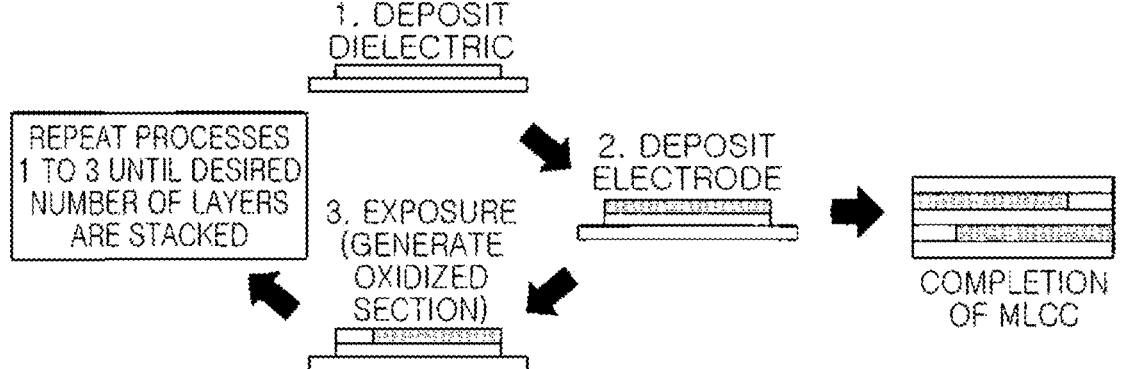
FIG. 4 schematically illustrates essential processes for manufacturing a multilayer electronic component according to an exemplary embodiment of the present disclosure.

FIG. 4 schematically illustrates essential processes for manufacturing a multilayer electronic component according to an exemplary embodiment of the present disclosure.

Figure 5:
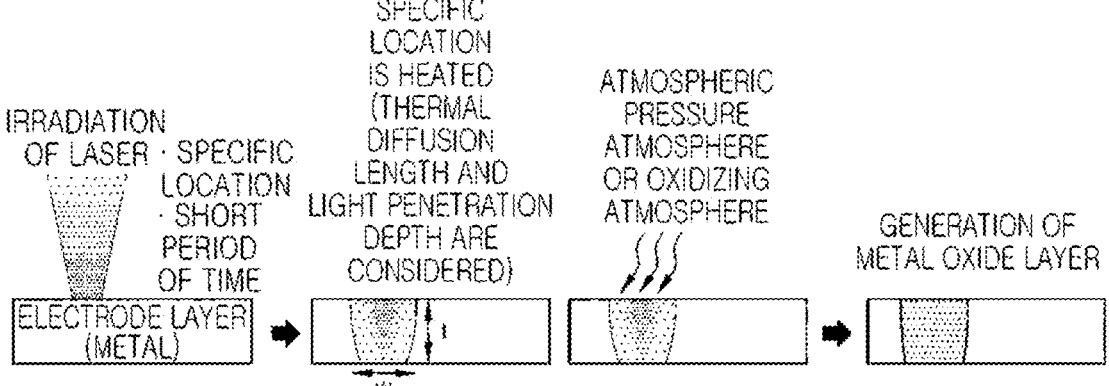
FIG. 5 schematically illustrates a process of forming a pattern by selectively irradiating laser to oxidize an electrode according to an exemplary embodiment of the present disclosure.

FIG. 5 schematically illustrates a process of forming a pattern by selectively irradiating laser to oxidize an electrode according to an exemplary embodiment of the present disclosure.

Figure 6:
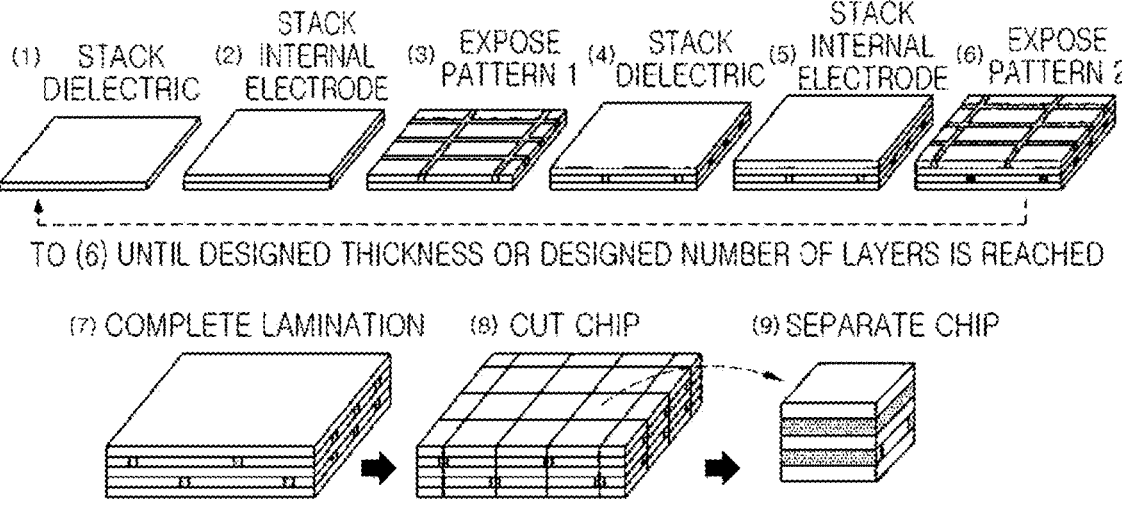
FIG. 6 schematically illustrates a method of manufacturing a multilayer electronic component according to an exemplary embodiment of the present disclosure.

FIG. 6 is a diagram schematically illustrating a method of manufacturing a multilayer electronic component according to an exemplary embodiment of the present disclosure.

Figure 7:
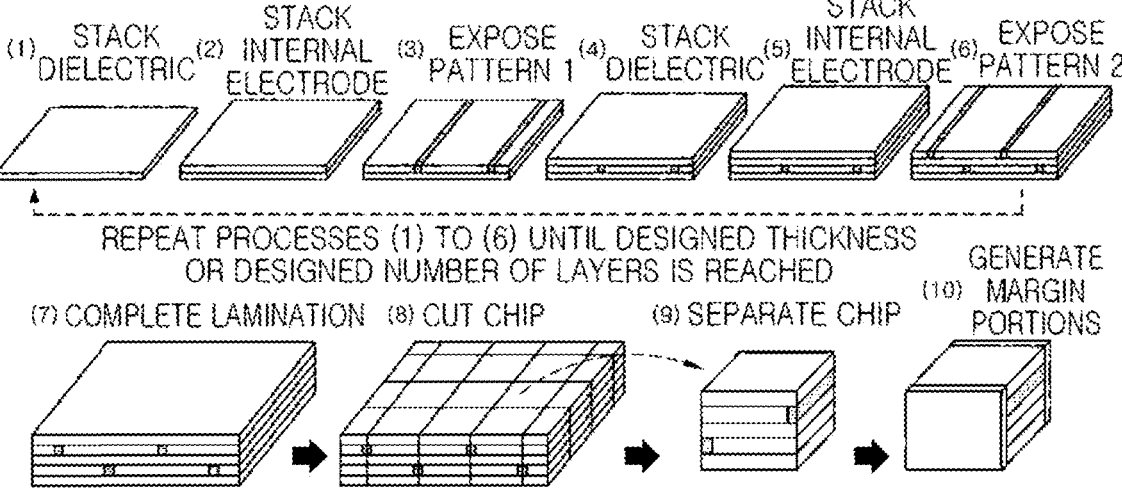
FIG. 7 schematically illustrates a manufacturing method including a separate process for generating margin portions as a method of manufacturing a multilayer electronic component according to another exemplary embodiment of the present disclosure.

FIG. 7 is a schematic diagram schematically illustrating a manufacturing method including a separate process for generating margin portions as a method of manufacturing a multilayer electronic component according to another exemplary embodiment of the present disclosure.

Hereinafter, a multilayer electronic component according to an exemplary embodiment of the present disclosure and a method of manufacturing the same will be described in detail with reference to FIGS. 1 to 7.

A multilayer electronic component 100 according to an exemplary embodiment of the present disclosure may include: a body 110 including dielectric layers 111 and internal electrodes 121 and 122 alternately stacked with respective dielectric layers interposed therebetween; and external electrodes 200 and 300 disposed on the body and connected to the internal electrodes (see FIGS. 1 and 2 of the present application).

In this case, the body 110 may include a plurality of dielectric layers 111 and a plurality of internal electrodes 121 and 122 respectively disposed between the plurality of dielectric layers. In the body, the dielectric layers 111 and internal electrodes 121 and 122 may be alternately stacked.

A specific shape of the body 110 is not particularly limited, and the body 110 may have a hexahedral shape or a shape similar to the hexahedral shape as illustrated in FIG. 1. Although the body 110 does not have a hexahedral shape having perfectly straight lines because materials contained in the body 110 shrinks during a manufacturing process, the body 110 may have a substantially hexahedral shape.

The body 110 may have first and second surfaces 1 and 2 opposing each other in the thickness direction (Z-direction), third and fourth surfaces 3 and 4 connected to the first and second surfaces 1 and 2 and opposing each other in the length direction (X-direction), and fifth and sixth surfaces 5 and 6 connected to the first and second surfaces 1 and 2, connected to the third and fourth surfaces 3 and 4, and opposing each other in the width direction (Y-direction).

According to an exemplary embodiment of the present disclosure, the dielectric layers 111 and the internal electrodes 121 and 122 may be formed by a deposition technique (including a physical or chemical deposition technique). Therefore, in the multilayer electronic component according to the present disclosure, the dielectric layers and the internal electrodes may be formed at a very thin thickness of several nanometers to several tens of micrometers, as compared with those in a multilayer electronic component manufactured according to a conventional method.

As an example, according to an exemplary embodiment of the present disclosure, the average thickness of the dielectric layers 111 may be 1 nm to 10 μm. According to the present disclosure, since the dielectric layers are formed by a deposition technique, the dielectric layers can be formed to be thin, thereby achieving the miniaturization and the integration of the multilayer electronic component.

In this case, a technique for measuring an average thickness of the dielectric layers described above is not particularly limited. Other methods and/or tools appreciated by one of ordinary skill in the art, even if not described in the present disclosure, may also be used. However, for example, with respect to any one of the dielectric layers 111 extracted from an image obtained by scanning a cross section of the body 110 in the X and Z-directions (length and thickness directions) cut at a central portion of the body 110 in the Y-direction (width direction) using a scanning electron microscope (SEM), thicknesses of the dielectric layer at five points equally spaced in the X-direction (length direction) may be measured to obtain an average value.

Similarly, as an example, according to an exemplary embodiment of the present disclosure, the average thickness of the internal electrodes 121 and 122 may be 1 nm to 10 μm. According to the present disclosure, since the internal electrodes are formed by a deposition technique, the internal electrodes can be formed to be thin, thereby achieving the miniaturization and the integration of the multilayer electronic component.

In this case, a technique for measuring an average thickness of the internal electrodes described above is not particularly limited. Other methods and/or tools appreciated by one of ordinary skill in the art, even if not described in the present disclosure, may also be used. However, for example, with respect to any one of the internal electrodes 121 and 122 extracted from an image obtained by scanning a cross section of the body 110 in the X and Z-directions (length and thickness directions) cut at a central portion of the body 110 in the Y-direction (width direction) using a scanning electron microscope (SEM), thicknesses of the internal electrode at five points equally spaced in the X-direction (length direction) may be measured to obtain an average value.

According to an exemplary embodiment of the present disclosure, a raw material forming the dielectric layers 111 is not particularly limited as long as it is capable of obtaining sufficient capacitance. For example, a barium titanate-based material, a lead composite perovskite-based material, a strontium titanate-based material, or the like may be used for the dielectric layers 111. Thereamong, the barium titanate-based material may include $BaTiO_3$-based ceramic, and examples of the ceramic may include $BaTiO_3$, and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca) and/or zirconium (Zr) is partially solid-dissolved in $BaTiO_3$. At this time, materials for forming the dielectric layers 111 may include various additives suitably usable for forming the dielectric layers 111 by the deposition technique according to the purpose of the present disclosure, in addition to the ceramic material such as barium titanate ($BaTiO_3$).

According to an exemplary embodiment of the present disclosure, the internal electrodes 121 and 122 may be alternately disposed with the dielectric layers 111 in the thickness direction (Z-direction). The internal electrodes may include first internal electrodes 121 and second internal electrodes 122. The first and second internal electrodes 121 and 122 may be alternately disposed to face each other with each of the dielectric layers 111, which constitute the body 110, being interposed therebetween, and exposed to the third and fourth surfaces 3 and 4 of the body 110, respectively.

The inventors have conducted intensive research to not only achieve high performance and miniaturization by thinning dielectric layers and electrode layers, but also solve a problem that a step portion causes a defect and a deterioration in reliability.

As a result, the inventors have adopted a multilayer ceramic capacitor (MLCC) manufacturing method in which dielectric layers and internal electrodes are formed on a wafer through a deposition technique, rather than a conventional multilayer ceramic capacitor (MLCC) manufacturing method in which molding, printing, stacking, and pressing step portions are performed.

Specifically, the inventors have found that, while dielectric layers and internal electrodes are formed by a deposition technique, if a metal oxide is formed by exposing one of end portions of at least one of the internal electrodes through laser irradiation, an internal electrode pattern can be formed without a step portion.

In general, in a case where a pattern is formed by a photolithography technique using laser irradiation, a number of detailed processes are required to form one pattern. For example, after depositing a dielectric layer and depositing an internal electrode, it is required to repeatedly perform chemical processes such as etching, which are not eco-friendly. In a case where the chemical processes are wet processes, cleaning and drying processes are additionally required. In particular, for an MLCC, tens to thousands of layers need to be stacked, and accordingly, the number of processes required to do so also greatly increases. If the above-described processes are applied to manufacture an MLCC, it is expected that the processes are performed as illustrated in a process diagram of FIG. 8.

Figure 8:
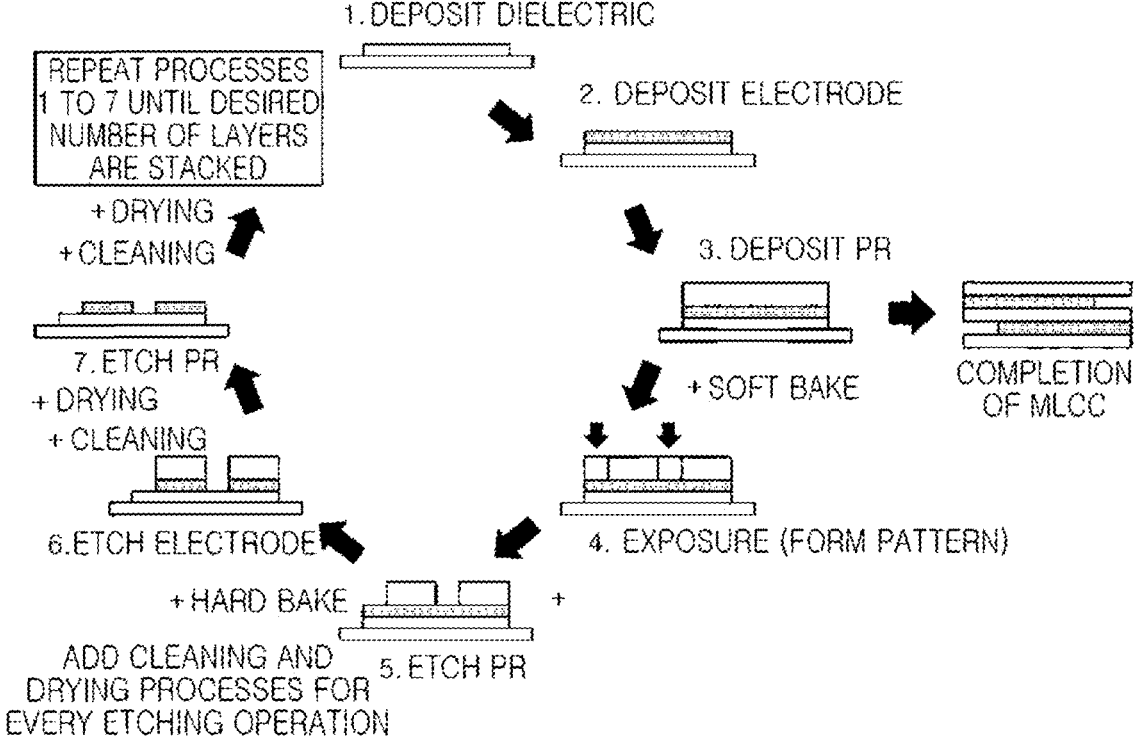
FIG. 8 schematically illustrates a manufacturing method expected when a typical photolithography process is applied to manufacture a multilayer electronic component.

However, as can be seen from FIG. 8, in a case where an MLCC is manufactured through such manufacturing processes, a level of difficulty increases in solving a step portion generated at a portion connected to an external electrode. This has a problem that it is required to additionally deposit a nonconductor in a step portion in a repeated manner for each stacking process, resulting in an increase in the number of necessary processes.

To solve the problem, the inventors have found that an MLCC having no step portion can be manufactured if an internal electrode pattern is formed through exposure by selectively irradiating one of end portions of an internal electrode in the length direction with laser for selective oxidization at the time of forming the internal electrode.

Techniques for forming a pattern using laser may be largely classified into two techniques. The first technique is a technique in which a pattern is formed using laser for direct processing. In this case, the pattern is formed by removing a material in a laser-irradiated area. The second technique is a technique in which a physical property of a material is changed by irradiating laser, for example, to change a dielectric into a conductor or increase a dielectric constant of the dielectric. In this case, unlike the first technique described above, it is not necessary to remove a laser-irradiated area.

Meanwhile, according to the present disclosure, an electrode pattern is formed by selectively irradiating laser to a specific location, which is a part of a region of an internal electrode formed through a deposition technique, for a short period of time without removing the laser-irradiated area (see FIG. 5 of the present application).

Specifically, as illustrated in FIG. 5, by precisely controlling laser processing conditions in consideration of a thermal diffusion length w and a light penetration depth t as the laser-irradiated area is heated, a metal oxide is formed at one of end portions of an internal electrode through a subsequent oxidation reaction in an atmospheric pressure atmosphere or in an oxidizing atmosphere. As a result, according to an aspect of the present disclosure, a metal oxide can be formed at one of end portions of at least one internal electrode, as illustrated in FIG. 5.

According to an exemplary embodiment of the present disclosure, as seen from the FIG. 5, the degree of exposure may be controlled in consideration of a thermal diffusion length w and a light penetration depth t as the specific location is heated by irradiating laser thereto. As a result, at a metal oxide-containing one of the end portions of the internal electrode according to an exemplary embodiment of the present disclosure, the metal oxide may be formed to have a width that decreases downward (that is, downward in the thickness direction (third direction or Z-direction) as illustrated in FIG. 5. Therefore, the decrease in width of the metal oxide in the Z-direction may be reduced in a case where the internal electrode is a thin layer, and the decrease in width of the metal oxide in the Z-direction may be further reduced by changing a process variable such as a laser irradiation location.

Therefore, according to the present disclosure, it is possible to form an electrode pattern through only an exposure process, while omitting processes of depositing and removing photoresist (PR) using a conventional photolithography technique. As a result, as illustrated in FIG. 4, the number of essential processes can be greatly reduced. Furthermore, since no material is directly removed, it is possible to manufacture an MLCC having no step portion as in a structure of a finished body illustrated in FIG. 4.

The above-described characteristic structure of the multilayer electronic component according to the present disclosure will be described in detail below. That is, in the multilayer electronic component according to the present disclosure, at least one of the internal electrodes 121 and 122 contains a metal oxide at one of end portions thereof.

Here, the end portions refer to portions located at both ends of any one of the internal electrodes 121 and 122 in the length direction (i.e., first direction or X-direction). Thus, portions located at both ends of the first internal electrode 121 in the length direction (i.e., first direction or X-direction) will be referred to as end portions 141 and 142 of the first internal electrode 121. Similarly, portions located at both ends of the second internal electrode 122 in the length direction (i.e., first direction or X-direction) will be referred to as end portions 151 and 152 of the second internal electrode 122.

Figure 9:
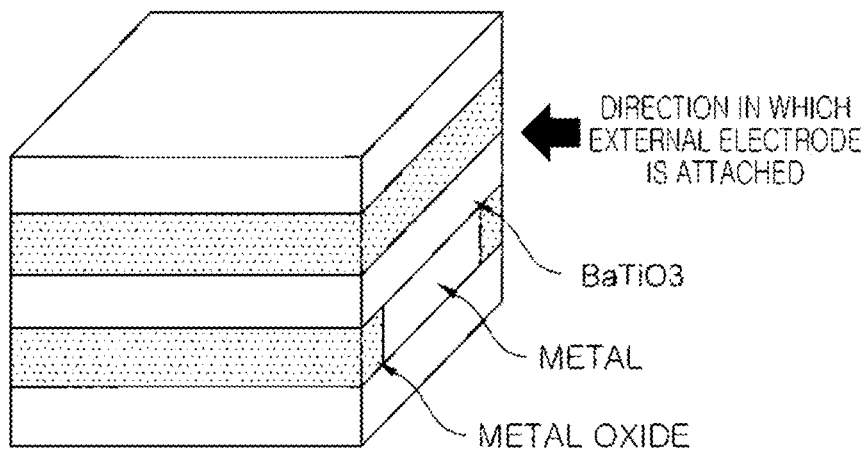
FIG. 9 schematically illustrates a method for detecting a metal oxide in an internal electrode according to an exemplary embodiment of the present disclosure.

Meanwhile, in the present disclosure, a technique for measuring whether or not a metal oxide is contained in the internal electrode described above is not particularly limited. Other methods and/or tools appreciated by one of ordinary skill in the art, even if not described in the present disclosure, may also be used. The measurement technique is illustrated in FIG. 9 as an example. Specifically, 10 MLCCs are prepared. Subsequently, each of the MLCCs is exposed so that a side to which an external electrode is attached is directed upward, followed by epoxy molding. Then, with respect to a total thickness t of the MLCC, the MLCC is polished by ¼ t to expose internal electrodes, dielectric layers, and margin portions. Then, with respect to the exposed cross section, it is checked whether a barium titanate (BT) and a metal oxide are detected for an internal electrode and an end portion of the internal electrode using component analysis equipment such as EDS/XRD/XPS.

According to an exemplary embodiment of the present disclosure, as illustrated in FIG. 2, one end portion 141 of the first internal electrode 121 may contact the first external electrode 200, and a metal oxide may be formed at the other end portion 142 of the first internal electrode 121. In this case, the metal oxide at the other end portion 142 of the first internal electrode 121 may contact the second external electrode 300. Also, a metal oxide may be formed in a portion of the one end portion 141 of the first internal electrode 121 as well.

In addition, according to an exemplary embodiment of the present disclosure, as illustrated in FIG. 2, one end portion 152 of the second internal electrode 122 may contact the second external electrode 300, and a metal oxide may be formed at the other end portion 151 of the second internal electrode 122. In this case, the metal oxide of the other end portion 151 of the second internal electrode 122 may contact the first external electrode 200. Also, a metal oxide may be formed in a portion of the one end portion 152 of the second internal electrode 122 as well.

Meanwhile, according to an exemplary embodiment of the present disclosure, the metal oxide contained in at least one of the internal electrodes may be formed by exposing one of the end portions in the length direction (i.e., first direction or X-direction) of the internal electrode, which is formed by a physical or chemical deposition technique, through laser irradiation.

In this way, an electrode pattern may be generated by selectively irradiating laser to only one of the end portions of the internal electrode. At this time, the selective irradiation of the light is performed for the purpose of creating a portion where an electrode is to be disconnected, rather than creating an electrode. The disconnection of the electrode can be achieved by oxidizing the electrode, rather than directly removing the electrode. In addition, the foregoing oxidation of the electrode can be achieved using a thermal influence caused by irradiating the laser.

According to an exemplary embodiment of the present disclosure, by forming a metal oxide in at least one of the internal electrodes using the above-described technique, it is possible to minimize chemical processes such as etching and wet processes required in a typical laser irradiation technique when a body of a multilayer electronic component is formed. By doing so, the use of chemicals can be minimized, thereby performing the processes in an eco-friendly manner, and minimizing the cost consumed for subsidiary materials. In addition, since the wet processes can also be minimized, it is possible to omit a drying or cleaning process, and minimize defects caused by moisture.

Furthermore, according to an exemplary embodiment of the present disclosure, an electrode pattern may be formed in various ways by changing a photo mask or setting a laser beam path during a manufacturing process. Specifically, various patterns can be implemented in one equipment by replacing a mask or changing software, which makes it possible to produce various kinds of products in small quantity. In addition, even when one chip is manufactured, it is possible to change a deposition pattern, thereby making it possible to implement different patterns in upper, middle, and lower portions of the chip. After all, according to the present disclosure, as various modifications can be made in designing a multilayer electronic component, the degree of freedom in design can be greatly improved.

According to an exemplary embodiment of the present disclosure, the metal oxide may be an oxide of a metal contained in the internal electrode. As a material for the internal electrode, a metal such as nickel (Ni) or copper (Cu) may be used. Therefore, the metal oxide contained in one of the end portions of the internal electrode may be a nickel (Ni) oxide or a copper (Cu) oxide. The copper (Cu) oxide may be copper(I) oxide and/or copper(II) oxide.

Specifically, in a case where the internal electrode is formed of a nickel (Ni) metal, the metal oxide contained in one of the end portions of the internal electrode may be a nickel (Ni) oxide. Similarly, in a case where the internal electrode is formed of a copper (Cu) metal, the metal oxide contained in one of the end portions of the internal electrode may be a copper (Cu) oxide.

According to an exemplary embodiment of the present disclosure, as illustrated in FIG. 2, the rest area of the internal electrode 121 other than the end portion 142, where the metal oxides are formed, may be spaced apart from the fourth surface 4 and exposed through the third surface 3. Similarly, the rest area of the second internal electrode 122 other than the end portion 151, where the metal oxides are formed, may be spaced apart from the third surface 3 and exposed through the fourth surface 4.

However, the end portion 142 where the metal oxide is formed in the first internal electrode 121 may be exposed through the fourth surface 4. Similarly, the end portion 151 where the metal oxide is formed in the second internal electrode 122 may be exposed through the third surface 3.

According to an exemplary embodiment of the present disclosure, when the end portions 142 and 151, where the metal oxides are formed, are excluded from the first and second internal electrodes 121 and 122, the first and second internal electrodes 121 and 122 may be alternately exposed to the third surface 3 and the fourth surface 4, which are opposite end surfaces of the body in the length direction (i.e., first direction or X-direction), respectively, and exposed to the first and second external electrodes 200 and 300, respectively.

That is, according to an exemplary embodiment of the present disclosure, when the end portions 142 and 151, where the metal oxides are formed, are excluded from the internal electrodes 121 and 122, the first internal electrode 121 may not be connected (or electrically connected) to the second external electrode 300, and may be connected (or electrically connected) to the first external electrode 200. Similarly, the second internal electrode 122 may not be connected (or electrically connected) to the first external electrode 200, and may be connected (or electrically connected) to the second external electrode 300.

Therefore, when the end portions 142 and 151, where the metal oxides are formed, are excluded from the internal electrodes 121 and 122, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically disconnected from each other by the dielectric layer 111 disposed therebetween.

As described above, according to the present disclosure, the end portions 142 and 151 in which oxides are contained may be formed by selectively irradiating laser for exposure to the moisture and/or oxygen in the atmosphere, rather than removing portions that need to be insulated from the internal electrodes 121 and 122. As a result, it is possible to manufacture an MLCC having no step portion, and thus, it is expected that defects resulting from the step portion can be eliminated.

The multilayer electronic component 100 may include external electrodes 200 and 300 disposed on the body 110 and connected to the internal electrodes 121 and 122, respectively. Specifically, the external electrodes may include first and second external electrodes 200 and 300 opposing each other in the length direction (i.e., first direction or X-direction). In this case, the internal electrodes may include first and second internal electrodes 121 and 122 connected to (or electrically connected to) the first and second external electrodes 200 and 300, respectively.

In the present exemplary embodiment, the structure of the multilayer electronic component 100 having two external electrodes 200 and 300 is described, but the number, shape, or the like of the external electrodes 200 and 300 may be changed according to the shape of the internal electrodes 121 and 122 or for another purpose.

Meanwhile, the external electrodes 200 and 300 may be formed using any material as long as it has electrical conductivity, such as a metal, and a specific material for the external electrodes 200 and 300 may be determined in consideration of electrical characteristics, structural stability, etc. Furthermore, the external electrodes 200 and 300 may have a multi-layer structure.

For example, the external electrodes 200 and 300 may include electrode layers 131*a* and 131*b* disposed on the body 110 and plating layers 132*a* and 132*b* formed on the electrode layers. As an example, the electrode layers 131*a* and 131*b* may be resin-based electrodes each containing a conductive metal and a resin.

Alternatively, each of the electrode layers 131*a* and 131*b* may have a form in which resin-based electrodes are sequentially formed on the body. Also, each of the electrode layers 131*a* and 131*b* may be formed by transferring a sheet containing a conductive metal onto the body.

A material having excellent electrical conductivity may be used as the conductive metal contained in the electrode layers 131*a* and 131*b*, and the conductive metal is not particularly limited. For example, the conductive metal may be one or more of nickel (Ni), copper (Cu), and an alloy thereof.

The plating layers 132*a* and 132*b* may serve to improve mounting characteristics. The plating layers 132*a* and 132*b* are not particularly limited in terms of type, and may be plating layers each containing at least one of Ni, Sn, Pd, and an alloy thereof. Also, each of the plating layers 132*a* and 132*b* may be formed of a plurality of layers.

As a more specific example, each of the plating layers 132*a* and 132*b* may be a Ni plating layer or a Sn plating layer, and particularly, may be a Sn plating layer. Alternatively, each of the plating layers 132*a* and 132*b* may have a form in which a Ni plating layer and a Sn plating layer are sequentially formed on the above-described electrode layer, or a form in which a Sn plating layer, a Ni plating layer, and a Sn plating layer may be sequentially formed on the above-described electrode layer. Also, each of the plating layers 132*a* and 132*b* may include a plurality of Ni plating layers and/or a plurality of Sn plating layers.

According to an exemplary embodiment of the present disclosure, as illustrated in FIG. 3, the body 110 may include a capacitance forming portion A disposed in the body 110 and forming a capacitance by including first internal electrodes 121 and second internal electrodes 122 disposed to face each other with each of the dielectric layers 111 interposed therebetween, and cover portions 112 and 113 formed on upper and lower surfaces of the capacitance forming portion A, respectively. The capacitance forming portion A, which contributes to forming a capacitance of the capacitor, may be formed by repeatedly stacking the plurality of first and second internal electrodes 121 and 122 with each of the dielectric layers 111 interposed therebetween.

According to an exemplary embodiment of the present disclosure, each of the upper cover portion 112 and the lower cover portion 113 may be formed by stacking a single dielectric layer or two or more (a plurality of) dielectric layers on the respective one of the upper and lower surfaces of the capacitance forming portion A in the thickness direction, and may basically serve to prevent the internal electrodes from being damaged due to physical or chemical stress.

According to an exemplary embodiment of the present disclosure, the upper cover portion 112 and the lower cover portion 113 may contain the same material as the dielectric layers 111, while including no internal electrodes.

That is, according to an exemplary embodiment of the present disclosure, the upper cover portion 112 and the lower cover portion 113 may contain a ceramic material, e.g., a barium titanate (BaTiO$_3$)-based ceramic material. In this case, it is not necessary to particularly limit a thickness tp of each of the cover portions 112 and 113.

In addition, according to an exemplary embodiment of the present disclosure, the margin portions 114 and 115 may be disposed on side surfaces of the capacitance forming portion A.

According to an exemplary embodiment of the present disclosure, the margin portions 114 and 115 may include a margin portion 114 disposed on the sixth surface 6 of the body 110 and a margin portion 115 disposed on the fifth surface 5 of the body 110. That is, the margin portions 114 and 115 may be disposed on opposite side surfaces of the ceramic body 110 in the width direction (second direction or Y-direction).

According to an exemplary embodiment of the present disclosure, as illustrated in FIG. 3, the margin portions 114 and 115 may refer to regions between both ends of the first and second internal electrodes 121 and 122 and boundary surfaces of the body 110 in a cross section of the body 110 cut in a width-thickness (Y-Z) direction.

According to an exemplary embodiment of the present disclosure, the margin portions 114 and 115 may basically serve to prevent the internal electrodes from being damaged due to physical or chemical stress.

According to an exemplary embodiment of the present disclosure, the margin portions 114 and 115 may be formed by one of the two techniques according to whether the margin portions are generated during a process of stacking dielectric layers and internal electrodes, a process of exposing the internal electrodes, and a processing of cutting a laminate.

Specifically, according to a manufacturing method according to an exemplary embodiment of the present disclosure, as illustrated in FIGS. 6 and 7, until a desired and designed thickness or a desired and designed number of layers is reached, a process of stacking a dielectric layer, a process of stacking an internal electrode, and a process of forming an electrode pattern by selectively irradiating the internal electrode with laser for exposure may be repeated to form a laminate. In the above-described process of forming the electrode pattern through exposure using laser irradiation, after laser to be used for exposure is prepared, an optical system suitable for a purpose of a mask projection technique, a line beam and stage, a beam scanner, or the like may be prepared. Thereafter, an oxide pattern may be formed by irradiating a laser beam. Subsequently, a chip may be manufactured by cutting the laminate using a dicing saw, laser, EDM, chemical etching, or the like.

In this case, as illustrated in step portions (8) and (9) of FIG. 6, the margin portions 114 and 115 may be formed without a separate process for forming the same by controlling an exposed portion to be aligned with a cut surface of a chip.

Alternatively, as illustrated in operation (10) of FIG. 7, after the laminate is formed, the margin portions 114 and 115 may be formed by cutting the laminate in such a manner that the internal electrodes are exposed to the fifth and sixth surfaces 5 and 6 of the body, and then stacking a plurality of dielectric layers on the opposite side surfaces of the capacitance forming portion A in the width direction (i.e., second direction or Y-direction).

Meanwhile, hereinafter, a method of manufacturing a multilayer electronic component according to another exemplary embodiment of the present disclosure will be described.

A method of manufacturing a multilayer electronic component according to another exemplary embodiment of the present disclosure may include: forming a body including dielectric layers and internal electrodes alternately stacked with respective dielectric layers interposed therebetween using a deposition technique; and forming external electrodes disposed on the body and connected to the internal electrodes, wherein one of end portions of at least one of the internal electrodes is irradiated with a laser for exposure.

In this case, concerning the deposition technique, the dielectric layers, the internal electrodes, the body, and the external electrodes, the above description may be identically applied to the method of manufacturing the multilayer electronic component.

In addition, according to an exemplary embodiment of the present disclosure, the irradiation of the laser may be performed so that a fluence threshold satisfies 1 J/cm² or less.

It is not necessary to particularly limit a size of the multilayer electronic component 100. However, in order to achieve both miniaturization and high capacitance, it is required to increase the number of dielectric layers and internal electrodes stacked on each other by thinning the dielectric layers and internal electrodes. Therefore, when multilayer electronic component 100 has a size of 0402 (length×width=0.4 mm×0.2 mm) or less, the reliability improving effect according to the present disclosure can be more remarkable.

Considering manufacturing errors, sizes of external electrodes, etc., when the multilayer electronic component 100 has a length of 0.44 mm or less and a width of 0.22 mm or less, the reliability improving effect according to the present disclosure can be more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

As set forth above, as one of the several effects of the present disclosure, it is possible to provide a multilayer electronic component having a high capacitance in a small size by thinning dielectric layers and internal electrodes.

As another one of the several effects of the present disclosure, it is possible to provide a multilayer electronic component having no step portion by forming an internal electrode pattern through selective irradiation of laser, and a method of manufacturing the same. As a result, it is possible to prevent a problem that a step portion causes a defect and a deterioration in reliability.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
a body including dielectric layers, first internal electrodes and second internal electrodes alternately stacked with respective dielectric layers interposed therebetween;
a first external electrode disposed on the body and connected to at least one of the first internal electrodes; and
a second external electrode disposed on the body and connected to at least one of the second internal electrodes and spaced apart from the first external electrode in a length direction,
wherein one end of at least one of the first internal electrodes in the length direction is in contact with the first external electrode, and the other end of the at least one of the first internal electrodes in the length direction is spaced apart from the second external electrode, with a first metal oxide disposed between and in contact with the other end of the at least one of the first internal electrodes and the second external electrode, and
wherein one end of at least one of the second internal electrodes in the length direction is in contact with the second external electrode, and the other end of the at least one of the second internal electrodes in the length direction is spaced apart from the first external electrode, with a second metal oxide disposed between and in contact with the other end of the at least one of the second internal electrodes and the first external electrode.

2. The multilayer electronic component of claim 1, wherein the first and second metal oxide is an oxide of a metal included in the at least one of the first and second internal electrodes.

3. The multilayer electronic component of claim 1, wherein the first and second metal oxide is a Ni oxide or a Cu oxide.

4. The multilayer electronic component of claim 1, wherein one end portion of at least one of the first internal electrodes contacts the first external electrode, and the first metal oxide is disposed in the other end portion of at least one of the first internal electrodes.

5. The multilayer electronic component of claim 1, wherein the first metal oxide is also disposed in at least a portion of the one end portion of at least one of the first internal electrodes.

6. The multilayer electronic component of claim 1, wherein one end portion of at least one of the second internal electrodes contacts the second external electrode, and the second metal oxide is disposed in the other end portion of at least one of the second internal electrodes.

7. The multilayer electronic component of claim 6, wherein the second metal oxide in the other end portion of at least one of the second internal electrodes contacts the first external electrode.

8. The multilayer electronic component of claim 6, wherein the second metal oxide is also disposed in at least a portion of at least one of the one end portion of the second internal electrodes.

9. The multilayer electronic component of claim 1, wherein the dielectric layers and the first and second internal electrodes are formed by a deposition technique.

* * * * *